2,991,285
PROCESS OF CYANATION AND NITRILES PRODUCED THEREBY
Wayne E. Feely, Jenkintown, Pa., assignor to Rohm & Haas Company, Philadelphia, Pa., a corporation of Delaware
No Drawing. Filed Sept. 9, 1958, Ser. No. 759,859
10 Claims. (Cl. 260—283)

This invention concerns a new process for introducing cyano groups into aromatically unsaturated nitrogen-containing heterocyclic compounds in which the nitrogen is a member of a six-membered ring, and to the nitriles produced thereby. These aromatically unsaturated nitrogen-containing heterocyclic compounds will, for ease of reference, be referred to hereinafter as "nitrogen heterocycles."

There are numerous prior art methods for producing cyano grouping-containing nitrogen heterocycles. Thus, one process comprises the steps of oxidizing an alkyl substituted nitrogen heterocycle with chromic acid, treating the resulting acid with ammonia to form the ammonium salt, dehydrating to produce the amide, and pyrolyzing the amide to the corresponding nitrile. As is well-known in the art, pyrolytic reactions generally give low yields of impure products. Another process involves the treatment of monohalopyridines with copper cyanide. The halopyridines are expensive and difficult to prepare, however. Another method comprises the fusion of pyridine sulfonates with alkali cyanides, with all the accompanying disadvantages of fusion processes. Other processes consist of vapor phase reaction of alkylpyridines with ammonia, a free oxygen-containing gas, and a variety of catalysts.

Another method for the preparation of cyanopyridines is heating a mixture of nicotinic acid and ammonia at temperatures in the range of 200° C. to 275° C. in the presence of a dehydrating agent. A mixture of cyanopyridine, nicotinamide and unreacted nicotinic acid is removed by distillation and is then further purified.

With minor variations in reaction conditions, most of these methods can be applied to other nitrogen heterocycles, such as quinoline and isoquinoline.

As set forth in U.S. Patent 2,494,204, 2-cyanopyridine can be prepared by the interaction of cyanogen and a 1,3-diene, such as butadiene. However, only 2-cyanosubstituted pyridines can be made and high operating temperatures are required. Specifically in the case of cyanogen and butadiene, the preferred operating temperature is in the range of 450° to 500° C. at atmospheric pressure. Furthermore, yields of the desired products are low.

An object of this invention is the preparation of compounds with fungicidal activity.

A further object of this invention is the preparation of compounds which are ultraviolet absorbents which can be used to stabilize a variety of materials and polymers against deterioration on exposure to ultraviolet light.

A further object of this invention is the preparation of compounds which are valuable in the synthesis of a large number of chemical compounds.

Because of the large number and variety of chemical compounds which can be prepared by the process, they find use in numerous applications as set forth hereinafter.

Surprisingly, it has been found that cyano groups may be readily introduced into nitrogen heterocycles by a very straightforward process under unusually mild reaction conditions. Furthermore, compared to other processes, the yields of the nitrile are remarkably higher. The process of this invention comprises the treatment of a solution of a N-alkoxy quaternary ammonium salt of said nitrogen heterocycles with a compound which will supply cyanide ion when present in said solution. The corresponding cyano substituted nitrogen heterocycle is so formed.

The N-alkoxy quaternary ammonium salts of the nitrogen heterocycles employed in the present invention are prepared as follows: The N-oxide of the nitrogen heterocycle is prepared by treatment of the nitrogen heterocycle with hydrogen peroxide as set forth by Ochiai, J. Org. Chem., 18, 548 (1953). The N-oxide compound so produced is reacted with an alkyl salt to produce the N-alkoxy quaternary ammonium compound.

Alkyl salts which may be used for the preparation of the quaternary ammonium compounds are alkyl halides, particularly bromides and iodides. However, the alkyl halides are expensive, and there are inherent experimental difficulties in preparing quaternary ammonium salts therefrom, including the use of solvents and the relatively low yields obtained. A preferred embodiment of this invention employs dialkyl sulfates as alkyl salts. The lower dialkyl sulfates are readily available at low cost and react readily with the N-oxides to give quantitative yields of the N-alkoxy quaternary ammonium alkyl sulfates. However, higher alkyl sulfates, such as di-n-decyl sulfate, are also operable and give crystalline, high-melting quaternary salts which are water-soluble and react readily in aqueous solution with the cyanide ion. While solvents which are chemically inert under the reaction conditions can be employed, no solvent is employed in the preferred embodiment.

The cyanide ion can be supplied by any compound which will supply cyanide ion to aqueous solutions or methanolic or ethanolic solutions. Preferred compounds are those which are highly ionized and have high solubilities. Suitable cyanides include the alkali metal cyanides, such as lithium, sodium and potassium, ammonium cyanide, and the higher alkaline earth cyanides, including barium and strontium cyanides. Particularly suitable are sodium and potassium cyanide, the latter being preferred if methanol or ethanol is used as a solvent for the reaction mixture.

Suitable nitrogen heterocycles include pyridine, quinoline, isoquinoline and substituted derivatives thereof, it being understood that the substituents are not reactive under the reaction conditions of the present invention. Thus, alkyl substituted nitrogen heterocycles react under essentially the same reaction conditions as the unsubstituted nitrogen heterocycles. The nitrogen heterocycles can be polysubstituted. Thus, the lutidines, i.e., the dimethylpyridines, can be used as set forth hereinafter. Similarly, other polyalkyl nitrogen heterocycles can be employed. Cyano substituted nitrogen heterocycles may also be employed, thus producing polycyano substituted nitrogen heterocycles. Carbalkoxy substituted nitrogen heterocycles in which the alkoxy group contains one to four carbon atoms may also be used. Lower alkoxy and lower acyl substituted nitrogen heterocycles may also be employed as may nitrogen heterocycles with nitro or quaternary amino substituents. Combinations of these substituents on one molecule are also useful compounds. Thus, for example, a cyanocarbalkoxy substituted nitrogen heterocycle can be employed. Aryl substituted nitrogen heterocycles are also operable.

The position of the substituents in the ring is very important. In the pyridine series, one of the positions 2, 4, or 6 must be unsubstituted if the cyanation reaction is to occur. The other two positions may be substituted by any combination of the substituent groups hereinbefore described. The more electrophilic groups facilitate the cyanation reaction. One or both of the 3 and 5 positions may be substituted by the substituent groups hereinbefore described. Groups in the 3 and/or 5 positions have less influence on the course of the reaction than if they were in the 2, 4, or 6 positions, although in this case also electrophilic substituents will aid the cyanide ion addition. Alkoxy groups in any position in the pyridine ring will give rise to salts which are much less reactive than the corresponding alkyl derivatives. This is especially true if they are in the 2, 4, or 6 positions.

In the case of the substituted quinolines, either the 2 or the 4 position must be available for substitution. It has been found that if both the 2 and the 4 positions are available for substitution, the 2 position appears to be more readily substituted. Substituents in the 3 position and in the benzenoid ring will influence the ease of cyanation. Electron withdrawing groups will facilitate the addition reaction and electron donating groups will tend to inhibit the reaction. In addition to the substituents set forth hereinbefore, the substituted quinolines can have halogen or hydroxyl groups in any of the 3, 5, 6, 7, and 8 positions.

In the case of the substituted isoquinolines, the 1 position must be unsubstituted. In addition to the substituents set forth hereinbefore, the substituted isoquinolines may have halogen or hydroxyl groups in any of the 4, 5, 6, 7, and 8 positions.

Suitable compounds include pyridine, 3-methylpyridine, 4-methylpyridine, 2-methylpyridine, 2,6-dimethylpyridine, 2,4-dimethylpyridine, 5-ethyl-2-methylpyridine, 2-cyanopyridine, 3-cyanopyridine, 4-cyanopyridine, 2-cyano-6-methylpyridine, quinoline, 2-methylquinoline, 4-methylquinoline, 2-cyanoquinoline, 4-cyanoquinoline, isoquinoline, ethyl nicotinate, ethyl isonicotinate, 3-carbethoxy-2,4-dimethylpyridine, 2-phenylpyridine, bipyridyl, 2,3-dicarbethoxypyridine, 2,3-dicarbmethoxypyridine, 2-benzylpyridine, 3,4-dicarbethoxypyridine, 2,3,4-trimethylpyridine, 4-carbethoxyquinoline, 1-methylisoquinoline, and 3-methylisoquinoline.

The N-oxides of the nitrogen heterocycles are prepared by the stepwise addition of one mole of hydrogen peroxide, as a 35% aqueous solution, to one mole of the nitrogen heterocycle dissolved in glacial acetic acid. The temperature of the reaction mixture is maintained at about 70° C. to about 90° C. for about six hours. After removal of the acetic acid by vacuum distillation, water is added and the N-oxide distilled in vacuo.

The N-alkoxy quaternary ammonium salts of the nitrogen heterocycles are prepared by mixing the N-oxide derivative with an alkyl salt and heating. Preferred alkyl salts for this reaction are dialkyl sulfates and although the higher dialkyl sulfates are equally as effective as the lower members of the series, the lower are preferred on an economic and availability basis. Thus, dimethyl sulfate is commonly employed. One mole of the dry powdered N-oxide is added to one mole of dimethyl sulfate at such a rate that the temperature of the reaction mixture is maintained at about 50° to about 100° C. When addition is complete, the reaction mixture is maintained at the same temperature for an additional two hours. Depending on the nitrogen heterocycle and the dialkyl sulfate employed, the quaternary ammonium compound may be either an oil or a crystalline solid. The yields are quantitative and the products are generally sufficiently pure that they can be used as such, without additional purification, for further reaction. Although an excess of either one of the reactants may be employed within the scope of this invention, the preferred embodiment employs a 1:1 molar ratio.

While the use of solvents which are chemically inert under the reaction conditions is within the scope of this invention, the preferred embodiment does not employ a solvent.

The reaction between the quaternary ammonium salt of the nitrogen heterocycle and a source of cyanide ion, such as potassium cyanide, is exothermic, the degree of exothermicity depending on the specific nitrogen heterocycle involved. In the case of pyridine itself, the reaction is very exothermic and it is necessary to maintain the temperature of the reaction mixture at approximately 0° C. in order to control the reaction. On the other hand, some substituted pyridines react very sluggishly and the reaction mixture must be maintained at about 100° C. for completion. The broad temperature range for this reaction is from about −10° C. to about 100° C.

It is preferred to use an excess of cyanide in order to utilize the quaternary ammonium compound to best advantage. Thus, the molar ratio of the quaternary ammonium compound to the cyanide should be from about 1:1.5 to about 1:5.

Although any solvent which will permit ionization of the cyanide, in which both compounds are soluble, and which is chemically inert under the reaction conditions can be employed, the preferred embodiments employ water or methanol or ethanol as a solvent. Of the two alcohols, methanol is preferred because the cyanides generally employed are more soluble in methanol. When using methanol as solvent, it is preferred to use potassium cyanide as the source of cyanide ion. Particularly preferred is the use of aqueous solutions since the quaternary ammonium salts of the nitrogen heterocycles are soluble therein and the soluble cyanides are highly ionized in aqueous solution.

The reaction between the quaternary ammonium compound and the cyanide can be effected in the presence or absence of air or oxygen. In the preferred embodiment, the reaction is conducted in the absence of air by blanketing the reaction mixture with a blanket of inert gas, such as nitrogen. This is particularly important in the case of the pyridine derivatives since a large amount of a tarry condensate is formed if the reaction is carried out in the presence of air or oxygen. Nitrogen heterocycles, other than pyridine, are less susceptible to tar formation.

As set forth hereinbefore, a large number of chemically diverse compounds can be prepared using the process of the present invention. Because of the great diversity of compounds possible, all the compounds which it is possible to make by the process of the present invention do not necessarily have the same utility. Thus, some are of interest as fungicides, some as ultraviolet stabilizers for polymers, and some as intermediates for the production of other valuable chemicals.

Two of the monocyano nitrogen heterocycles prepared by the process of the present invention were tested to determine their fungicidal activities. They were 1-cyanoisoquinoline and 2-cyanoquinoline, herein designated as Compounds I and II respectively. The results of these tests are set forth in Table I. The test method employed is a commonly used test for determining fungitoxicity and the details are set forth in Phytopathology, 33, 627–632 (1943). Typical fungi commonly employed to determine fungicidal activity are *Stemphylium sarcinaeforme* (*S.s.*) and *Monilinia fructicola* (*M.f.*), and these two fungi were used to obtain the data set forth in Table I. The dilute solutions for this test were prepared by dissolving 1 gram of each of the compounds in 20 cc. of acetone and then adding 79 cc. of water to make a 1% solution. This 1% solution was then diluted with water to form the 0.1% solution employed in the test. A spore suspension of *Monilinia fructicola* (*M.f.*) or *Stemphylium sarcinaeforme* (*S.s.*) in an amount of 0.5 cc. was added to 2.0 cc. of each of the 0.1% solutions and four drops of each of the resulting suspensions were pipetted onto individual glass slides which had been previously coated with cellulose nitrate. These slides were then placed in large Petri plates sealed with water and held at a constant temperature for 16 to 24 hours at which time the percentage of spores showing no germination was determined. This was done by counting 25 spores in the center of each of the four drops on each slide with the proper correction being made for non-viable spores as determined by the control (untreated) slides in each chamber. Stemphylium sarcinaeforme spore suspensions were standardized to 5000 spores per cc. and Monilinia fructicola suspensions to 10,000 spores per cc. for use in this test. The values shown in Table I indicate satisfactory fungitoxicity.

TABLE I

| Compound | Concentration of Solution, percent | Percent Inhibition of Spore Germination | |
|---|---|---|---|
| | | M.f. | S.s. |
| I | 0.1 | 100 | 100 |
| II | 0.1 | 100 | 100 |

The products from the process of the present invention find wide utility in the synthesis of many valuable compounds. Because of the well-known reactivity of the cyano group, it is possible by simple well-known reactions to obtain, for instance, the corresponding amides, acids, esters or amines. Since it is possible to introduce more than one cyano group into the ring, the polysubstituted nitrogen heterocycles containing the hereinbefore described derivatives from the cyano group can also be obtained. The synthesis of the new polynitrogen heterocycle pyridylguanamine and a typical organic solvent-soluble, heat reactive condensate with formaldehyde represents one such synthesis. The experimental details are as follows:

I. Synthesis of pyridylguanamine

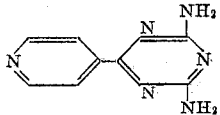

M.W.—188.2

REAGENTS 4-cyanopyridine _____ 52.05 g. (0.5 mole).
Dicyandiamide _____ 56.10 g. (0.67 mole).
Methyl Cellosolve _____ 166.7 g.

CATALYST

Potassium hydroxide—2.8 g. (5% of the weight of dicyandiamide).

PROCEDURE

Into a one-liter, three neck round bottom flask equipped with stirrer, oil bath, water condenser, and thermometer were placed the 4-cyanopyridine, dicyandiamide, and methyl Cellosolve. This mixture was heated to reflux (136° C.) with stirring, during which period the reactants dissolved. Approximately 8% of the potassium hydroxide was added, and a very slight exotherm was noted. In a few minutes, a whitish solid precipitated. Another 8% of the catalyst was added ten minutes after the first addition. Ten minutes later (0.33 hours reaction), 16% of the original catalyst weight was added. These two additions caused minute exotherms, as evidenced by a temporary increase in the reflux rate after each addition. Catalyst (15% fractions) was added at one, one-and-three-quarters, and two-and-a-half hours reaction. No exotherm or icreased reflux rate was noted and the temperature dropped gradually from 136° C. to 128° C. during this time. The remaining catalyst was added at three-and-three-quarter hours reaction time. The reflux temperature dropped gradually to 126° C. at six hours reaction time. The total reaction time was eight hours.

The yellowish precipitate was removed from the reaction mixture by suction filtration, and it was washed with 2000 milliliters of hot water to remove unreacted starting material. The remaining white solid was dried in a steam oven for approximately twenty hours with occasional stirring.

Theoretical yield _____ 94.1 g. (0.5 mole).
Actual yield _____ 84.8 g. (90% yield).
M.P. (uncorrected) _____ 283°–285° C.

A portion of the product was recrystallized from methyl Cellosolve/water with very poor recovery. M.P. 289°–289.5° C.

| Analysis | Percent C | Percent H | Percent N |
|---|---|---|---|
| Expected | 51.05 | 4.28 | 44.65 |
| Found | 50.39, 50.42 | 4.82, 4.84 | 44.16, 44.31 |

II. Synthesis of pyridylguanamine-formaldehyde-n-butanol condensate

CHARGE

|  | Mole |
|---|---|
| A. 141.0 g. pyridylguanamine | 0.75 |
| B. 185.0 g. aqueous formaldehyde (36.5%) | 2.25 |
| C. 278.0 g. n-butyl alcohol | 3.75 |
| D. 50.0 g. xylol. | |
| E. 0.75 ml. 50% formic acid. | |
| F. 30.0 g. Amberlite IR-120 (H+ form) (a sulfonic type cation exchange resin). | |

APPARATUS (1) 3-neck flask equipped with thermometer, mechanical agitator, reflux condenser and separator designed for return of upper (organic) layer and withdrawal of lower (aqueous) layer.

PROCEDURE (1) Materials A, B, C, and D were charged to the flask. The separator was filled approximately half with water and the rest of the way with xylol. The batch was then heated to reflux (93° C.).

(2) Reflux with continuous removal of aqueous phase was continued until a quantity of aqueous phase approximately equal to the quantity of solvent water in the initial charge was collected (in this case 117.0 ml.). At this point, heat input was reduced while formic acid, "E," was added to the batch (reflux conditions were maintained however). The appearance of the batch at this point was still a "creamy" white.

(3) Reflux with continuous withdrawal of aqueous phase was continued until separation of the aqueous phase had virtually ceased (162 ml. collected). The batch was still creamy white in appearance at this point and apparently contained considerable undissolved solid (presumably either unreacted guanamine or the methylol derivative).

(4) Amberlite IR-120, "F," was then charged to the batch and reflux was resumed. An additional 30.0 ml. of aqueous phase separated and was collected over a 1½ hour period (batch temperature at this point—121° C.). The appearance of the batch at this point was still somewhat "milky" though it was evident that the amount of undissolved solid was very small.

(5) The batch was filtered at this point. The physical constants were as follows:

Viscosity (Gardner-Holdt scale) _____ A-3.
Solids _____ 48.8%.
Mineral thinner tolerance _____ 52 cc./10 g.
Isooctane tolerance _____ 28 cc./10 g.

When used in the manner well-known to those skilled in the art, i.e., baked with a drying or non-drying alkyd, tough, hard, abrasion resistant films were obtained.

The problem of the deterioration of plastics due to exposure to ultraviolet light is well-known, and numerous means of prevention of such deterioration have been tested in the past. The results of deterioration due to exposure to ultraviolet light are numerous and varied and include such effects as discoloration, cracking, crazing, or loss of gloss of the surface of the plastic article, loss of strength, etc. One common method of preventing said deterioration involves the incorporation into the plastic of compounds which are commonly known as "UV Stabilizers." These compounds generally exhibit high molar extinction coefficients in the ultraviolet region. Several of the compounds prepared by the process of the present invention show unusually high molar extinction coefficients, which compounds include 4-cyanopyridine-1-oxide and 3-carbethoxy-4-cyano-6-methylpyridine-1-oxide. A standard test for protection of a plastic composition was conducted on 4-cyanopyidine-1-oxide comparing it with commercially available UV stabilizers widely employed in industry. These commercially available UV stabilizers were Salol (phenyl salicylate) and 2-hydroxy-4-methoxybenzophenone. The plastic composition employed was a commercially available polyester-styrene-methyl methacrylate resin in which the ratios of the three components were 60:20:20 (parts by weight). The polyester component was the reaction product of phthalic anhydride, maleic anhydride and a dihydric glycol. The preparation and use of unsaturated polyesters of this type is described in numerous United States patents, including U.S. 2,610,168 and U.S. 2,632,753.

The resin was catalyzed by incorporating 0.5 percent by weight of benzoyl peroxide, the stabilizer was incorporated and the resin was poured onto glass mats and covered with two sheets of cellophane. Final composition contained 25% by weight of glass mat. The resin was then cured between two sheets of glass by heating for six hours at 55° C., followed by two hours heating at 120° C.

The specimens so prepared were exposed for 1500 hours on an Atlas Weatherometer, Enclosed Twin Violet Carbon Arc type DMC–R. Test method was according to A.S.T.M. E–42–55T with a two-hour repeating cycle consisting of 102 minutes with arcs only and 18 minutes with arc and spray.

The samples where then visually rated by several experienced observers according to the following code:

(1) Change perceptible by careful examination
(2) Change perceptible by casual examination
(3) Significant change in shade
(4) Original color nearly gone
(5) Original color no longer evident Y—Yellowed
F—Faded
D—Darkened These data were obtained:

| Specimen: | Visual rating |
|---|---|
| Resin+0.5% Compound I | 1 Y |
| Resin+0.25% Compound II | 1 Y |
| Resin+0.007% Compound III | 1½ Y |

Compound I is phenyl salicylate.
Compound II is 2-hydroxy-4-methoxybenzophenone.
Compound III is 4-cyanopyridine-1-oxide.

While the sample containing 4-cyanopyridine-1-oxide shows slightly more yellowing, the high effectiveness of 4-cyanopyridine-1-oxide is readily apparent from a comparison of the concentrations of each UV stabilizer necessary to obtain the desired stabilization. Most of the commercially acceptable UV stabilizers are very expensive, so that high efficiency is much to be desired.

The following examples set forth certain well-defined embodiments of the application of this invention. They are not, however, to be considered as limitations thereof, since many modifications may be made without departing from the spirit and scope of this invention.

Unless otherwise specified, all parts are parts by weight.

In the following preparations, all temperatures are centigrade unless otherwise so noted.

PREPARATION OF N-OXIDES

The heterocyclic N-oxides described below were prepared essentially by the Method of Ochiai (J. Org. Chem., 18, 548 (1943)). This is by far the most convenient method of preparation and is the method generally employed by those skilled in the art.

2,4-lutidine-1-oxide

To a solution of 107 grams (1.0 mole) of 2,4-lutidine dissolved in 300 ml. of glacial acetic acid was slowly added 33 grams (0.33 mole) of 35% hydrogen peroxide. The solution was slowly heated to 80° on a steam bath. After one hour, another 33 gram-portion of 35% peroxide was added and, finally, after another hour, a third portion of 33 grams (1.0 mole total) of peroxide was added. The temperature was maintained at 80° for an additional three hours (6 hours total). The solution was transferred to a distillation apparatus and 200 ml. of acetic acid was removed in vacuo. Two hundred ml. of water was then added and the solution was distilled to 100° at 10 mm. pressure. 2,4-lutidine-1-oxide was obtained as an amber oil weighing 132 grams. The oxide was used in subsequent experiments without further purification.

Quinoline-1-oxide

Quinoline-1-oxide was prepared from synthetic quinoline by the method described for 2,4-lutidine-1-oxide using 100 grams of quinoline and 300 ml. of glacial acetic acid. The N-oxide was obtained as a tan oil, which crystallized upon standing overnight in a vacuum desiccator over phosphorus pentoxide. The oxide was used without further purification.

Isoquinoline-2-oxide

Isoquinoline-2-oxide was prepared by the method described above from 100 grams (0.84 mole) of isoquinoline, 85 grams (0.85 mole) of 35% hydrogen peroxide using 300 ml. of glacial acetic acid. After evaporation and drying over phosphorus pentoxide, the N-oxide was obtained as a tan solid and was used without further purification.

Quinaldine-1-oxide

Quinaldine-1-oxide was prepared by the method described above from 100 grams (0.84 mole) of quinaldine, 85 grams (0.85 mole) of 35% hydrogen peroxide using 300 ml. of glacial acetic acid. The N-oxide crystallized during evaporation and the tan solid was dried over phosphorus pentoxide and used without further purification.

Lepidine-1-oxide

Lepidine-1-oxide was prepared by the method described above from 100 grams (0.70 mole) of lepidine, 70 grams (0.70 mole) of 35% hydrogen peroxide using 300 ml. of glacial acetic acid. The oxide crystallized after evaporation and was dried over phosphorus pentoxide and used without further purification.

4-cyanopyridine-1-oxide

To a solution of 100 grams (0.93 mole) of 4-cyanopyridine dissolved in 500 ml. of glacial acetic acid was slowly added 33 grams (0.33 mole) of 35% hydrogen peroxide. The solution was slowly warmed on a steam bath to 80° and maintained at that temperature for one hour. Then an additional 33 grams (0.33 mole) of peroxide was added and the temperature held at 80° for one hour, after which time a third portion of 33 grams (1.0 mole total) of peroxide was added. The temperature was maintained at 80° for an additional three hours and then the 400 ml. of acetic acid was removed in vacuo. The oxide crystallized from the mixture during evaporation. Three hundred ml. of cold water was added to the mixture and the oxide was removed by filtration. There was obtained 112 grams (96%) of 4-cyanopyridine-1- oxide as tan crystals. An analytical sample was prepared by sublimation in vacuo (150° at 1 mm.), melting 226° to 228°. Analysis calculated for $C_6H_4N_2O$: percent C, 60.00; percent H, 3.36; and percent N, 23.33. Found: percent C, 60.15; percent H, 3.47; and percent N, 23.18.

PREPARATION OF THE QUATERNARY SALTS OF THE N-OXIDES

1-methoxypyridinium methyl-sulfate

To 95 grams (1.0 mole) of dry powdered pyridine-1-oxide was slowly added 126 grams (1.0 mole) of dimethyl sulfate at such a rate that the temperature of the reaction mixture was maintained at 80° throughout the addition. When the addition was completed (1 hour), the solution was heated on a steam bath for two hours. The 1-methoxypridinium methyl sulfate formed was found to be a brown, hygroscopic oil and was used in subsequent experiments without further purification.

1-methoxy-2-methylpyridinium methyl-sulfate

This salt was prepared in the same manner as 1-methoxy-pyridinium methyl sulfate by using 109 grams (1.0 mole) of 2-picoline-1-oxide and 126 grams (1.0 mole) of dimethyl sulfate. Upon cooling, the salt crystallized. Recrystallization from anhydrous acetone gave white crystals, melting 57° to 60°. Calculated for $C_8H_{13}NO_5S$: percent C, 40.84; percent H, 5.57; and percent N, 5.96. Found: percent C, 40.57; percent H, 5.66; and percent N, 5.63.

1-methoxy-4-methylpyridinium methyl-sulphate

This salt was prepared in the same manner as 1-methoxy-pyridinium methyl-sulfate by using 109 grams (1.0 mole) of 4-picoline-1-oxide and 126 grams (1.0 mole) of dimethyl sulfate. Upon cooling, the salt crystallized. Recrystallization from anhydrous acetone gave white crystals, melting 69° to 73°. Calculated for $C_8H_{13}NO_5S$: percent C, 40.84; percent H, 5.57; and percent N, 5.96. Found: percent C, 39.84; percent H, 5.52; and percent N, 5.77.

1-methoxy-3-methylpyridinium methyl-sulphate

This salt was prepared in the same manner as 1-methoxy-pyridinium methyl-sulfate by using 109 grams (1.0 mole) of 3-picoline-1-oxide and 126 grams (1.0 mole) of dimethyl sulfate. The salt was found to be a dark reddish brown oil and was used in subsequent experiments without further purification.

1-methoxy-2,6-dimethylpyridinium methyl-sulfate

This salt was prepared in the same manner as 1-methoxy-pyridinium methyl-sulfate using 123 grams (1.0 mole) of 2,6-lutidine-1-oxide and 126 grams (1.0 mole) of dimethyl sulfate. The salt crystallized upon cooling. Recrystallization from anhydrous acetone gave white needles, melting 95° to 97°. Calculated for $C_9H_{15}NO_5S$: percent C, 43.36; percent H, 6.07; and percent N, 5.62. Found: percent C, 43.14; percent H, 6.20; and percent N, 5.49.

1-methoxy-2,4-dimethylpyridinium methyl-sulfate

This salt was prepared by the same method as 1-methoxy-pyridinium methyl-sulfate using 126 grams (1.0 mole) of dimethyl sulfate and 123 grams (1.0 mole) of 2,4-lutidine-1-oxide. The salt was obtained as a brown oil and was used in subsequent experiments without further purification.

1-methoxy-2-methyl-5-ethylpyridinium methyl-sulfate

This salt was prepared by the same method as 1-methoxy-pyridinium methyl-sulfate using 69 grams (0.5 mole) of 2-methyl-5-ethylpyridine-1-oxide and 63 grams (0.5 mole) of dimethyl sulfate. The salt was obtained as a brown oil and was used in subsequent experiments without further purification.

1-methoxyquinolinium methyl-sulfate

This salt was prepared in the same manner as 1-methoxy-pyridinium methyl-sulfate by using 72 grams (0.5 mole) of quinoline-1-oxide and 63 grams (0.5 mole) of dimethyl sulfate. Upon cooling, the salt was obtained as a brown oil and was used in subsequent experiments without further purification.

1-methoxy-2-methylquinolinium methyl-sulfate

This salt was prepared in the same manner as 1-methoxy-pyridinium methyl-sulfate by using 80 grams (0.5 mole) of quinaldine-1-oxide and 63 grams (0.5 mole) of dimethyl sulfate. Upon cooling, the salt was obtained as a brown oil and was used in subsequent experiments without further purification.

1-methoxy-4-methylquinolinium methyl-sulfate

This salt was prepared by the same method as 1-methoxy-pyridinium methyl-sulfate using 80 grams (0.5 mole) of lepidine-1-oxide and 63 grams (0.5 mole) of dimethyl sulfate. Upon cooling, the reaction mixture, the salt was obtained as a purple oil, which was used in subsequent experiments without further purification.

2-methoxyisoquinolinium methyl-sulfate

This salt was prepared in the same manner as 1-methoxy-pyridinium methyl-sulfate by using 72 grams (0.5 mole) of isoquinoline-2-oxide and 63 grams (0.5 mole) of dimethyl sulfate. The salt was obtained as a light brown oil and was used in subsequent experiments without further purification.

n-Nonyloxypyridinium iodide

A mixture of 24 grams (0.25 mole) of pyridine-1-oxide and 62 grams (0.25 mole) of n-nonyl iodide dissolved in 200 ml. of dry acetone was refluxed for 12 hours. Upon cooling the reaction mixture in an ice-salt bath, crystallization occurred. There was obtained 47 grams (55%) of the salt as pale yellow crystals, melting 87° to 90°. Calculated for $C_{14}H_{24}NOI$: percent C, 48.14; percent H, 6.93; and percent N, 4.01. Found: percent C, 49.57; percent H, 7.18; and percent N, 3.87.

1-10-di-(1-oxypyridinium)-decane di-iodide

A mixture of 48 grams (0.50 mole) of pyridine-1-oxide and 78 grams (0.20 mole) of 1,10-diiododecane dissolved in 400 ml. of dry acetonitrile was refluxed 12 hours. Upon cooling, the salt separated from the solution as an orange crystalline product. Recrystallization from dry acetonitrile gave orange crystals, melting 118° to 120°, with decomposition. Calculated for $C_{20}H_{30}N_2O_2I_2$: percent C, 41.11; percent H, 5.18; percent N, 4.80. Found: percent C, 41.28; percent H, 5.21; and percent N, 4.65.

Bis-(methylene-1-oxypyridinium)-oxide dichloride

To a solution of 48 grams (0.50 mole) of pyridine-1-oxide in 400 ml. of dry acetonitrile was slowly added 23 grams (0.20 mole) of bis-chloromethyl ether. During the addition, a white, taffylike material separated from the solution. When the addition was completed (0.5 hour), the solution was stirred for an additional three hours and the salt was then filtered from the solution as a white crystalline powder, melting at 104° to 108° C. with decomposition. Calculated for $C_{12}H_{14}O_3N_2Cl_2$: percent C, 47.23; percent H, 4.62; and percent N, 9.18. Found: percent C, 45.83; percent H, 4.67; and percent N, 10.16.

EXAMPLE I

4-cyanopyridine from 1-methoxypyridinium methylsulfate

To a solution of 66 grams (1 mole) of potassium cyanide dissolved in 250 ml. of water was slowly added a solution of 104 grams (0.5 mole) of 1-methoxypyridinium methyl-sulfate. During the addition (1.5 hours), the temperature of the reaction mixture was maintained between 0° and 10°. After the addition was completed, the mixture was held at 4° overnight. The solution was then extracted with three 150 ml. portions of chloroform. The combined chloroform extract was then dried over magnesium sulfate and the chloroform was removed by distillation, leaving 35 grams (65%) of a high boiling material. Distillation gave 24.8 grams (46%) of crude 4-cyanopyridine, boiling 190° to 210°. Recrystallization from water gave 17 grams (32%) of 4-cyanopyridine, melting 73° to 78°. A sample was further purified by recrystallization from water and melted at 80° to 82°.

EXAMPLE II

*4-cyanopyridine from 1-(n-nonyloxy)-pyridinium iodide*

To a solution of 19.8 grams (0.30 mole) of potassium cyanide dissolved in 150 ml. of water was slowly added a solution of 35 grams (0.10 mole) of 1-(n-nonyloxy)-pyridinium iodide. The yellow color of iodide salt solution was rapidly discharged by this addition and a colorless oil separated from the solution. When the addition was completed (0.5 hours), the mixture was extracted with two 50 ml. portions of ether. The combined ether extract was then washed with two 15 ml. portions of 10% aqueous hydrochloric acid and then with 15 ml. of water. The ether extract was then dried over magnesium sulfate and the ether removed by distillation. The residual oil (13.8) grams) was distilled at atmospheric pressure and the fraction boiling at 210° to 215° collected. This gave 10.5 grams (75%) of n-nonyl alcohol, $n_D^{20}$ 1.4328.

*Phenylurethane*

One gram of n-nonyl alcohol was heated on a steam bath with 0.5 ml. of phenyl isocyanate for five minutes. The solution was then cooled in an ice bath whereupon crystallization occurred. The crystals were separated from the solution and recrystallized from carbon tetrachloride, yielding the white, crystalline phenylurethane of n-nonyl alcohol, melting 62.5° to 63.5°.

The combined hydrochloric acid extract was neutralized with sodium carbonate solution and extracted with two 5 ml. portions of ether. The combnied ether extract was dried with magnesium sulfate and evaporated, leaving 4.4 grams (42%) of crude 4-cyano-pyridine. This material was recrystallized three times from water to give a pure sample of 4-cyanopyridine, melting 80° to 82°. A mixed melting point with an authentic sample of 4-cyanopyridine showed no depression. Furthermore, a comparison of ultraviolet spectra of the samples showed them to be identical, UV max., 270 mu; $\epsilon$, $3.08 \times 10^3$. An infrared comparison of the samples, run as potassium bromide pellets, also showed them to be identical. Analysis.—calcualted for $C_6H_4N_2$: percent C, 69.22; percent H, 3.87; and percent N, 26.91. Found: percent C, 69.56; percent H, 4.20; and N, 27.01.

*Picrate*

A small sample of 4-cyanopyridine was dissolved in a hot 50% ethanolic solution and treated with excess picric acid. Upon cooling, the picrate separated from the solution as yellow needles, melting 200° to 203°. A picrate prepared in a similar manner from an authentic sample of 4-cyanopyridine melted at 202° to 204° and a mixture of the two picrates showed no depression of melting point. Analysis—calculated for $C_{12}H_7N_5O_7$: percent C, 43.25; percent H, 2.12. Found: percent C, 43.32; and percent H, 2.68.

*Hydrochloride*

The hydrochloride of 4-cyanopyridine was prepared by dissolving 1 gram of the cyanopyridine in 50 ml. of chloroform. The solution was cooled in an ice bath and saturated with dry hydrogen chloride. A white, crystalline hydrochloride separated from the solution. Recrystallization from acetone gave white needles, melting 244° to 247° with decomposition. Analysis—calculated for $C_6H_5N_2Cl$: percent C, 51.26; and percent H, 3.59. Found: percent C, 51.52; and percent H, 3.86.

*Isonicotinic acid*

To 100.0 ml. of 0.500 N sodium hydroxide solution was added 1.5 gram of 4-cyanopyridine. The solution was refluxed five hours, during which time ammonia was evolved from the solution. The solution was then distilled to one-half its original volume and 100.0 ml. of 0.500 N hydrochloric acid added. The solution was then evaporated under vacuum to dryness and the residual white solid washed with three portion of warm water to remove inorganic salts. The acid, dried under vacuum, showed a neutralization equivalent of 120 (calculated 123) and a melting point of 307° to 310°.

EXAMPLE III

*4-cyanopyridine from 1,10-di-(1-oxypyridinium)-decane di-iodide*

A solution of 17.4 grams (0.03 mole) of 1,10-di-(1-oxypyridinium)-decane di-iodide dissolved in 50 ml. of water was slowly added to a solution of 6.6 grams (0.1 mole) of potassium cyanide dissolved in 50 ml. of water at room temperature. The yellow color of the iodide solution was discharged upon addition to the cyanide solution and a white solid material separated from the solution. When the addition was completed, the solid was separated from the solution by filtration and then recrystallized from a water-ethanol mixture. This yielded 4.3 grams (82%) of 1,10-decanediol, melting 72° to 74°. Analysis—calculated for $C_{10}H_{22}O_2$: percent C, 68.91; percent H, 12.72. Found: percent C, 68.20; percent H, 12.71.

*Diacetate*

A solution of 1,10-decanediol in 25 ml. of acetic anhydride was heated on a steam bath overnight. The solution was evaporated under reduced pressure and the dark residue taken up in a hot water-ethanol mixture. Cooling the solution in an ice bath gave the diacetate as colorless plates, melting 23° to 26°.

The aqueous phase was extracted with two 25 ml. portion of ether. The combined extract was dried over magnesiumsulfate and evaporated. There remained 2.3 grams (37%) of crude 4-cyanopyridine. A pure sample of the cyanopyridine was obtained by repeated recrystalization from water, melting 79° to 81°.

EXAMPLE IV

*2-cyano-6-methylpyridine from 1-methoxy-2-methylpyridinium methyl-sulfate*

An aqueous solution of 118 grams (0.5 mole) of 1-methoxy-2-methylpyridinium methyl-sulfate was slowly added to a solution of 66 grams (1.0 mole) of potassium cyanide solution was cooled in an ice bath and the addition of the sulfate solution was controlled so that the temperature of the reaction mixture did not rise above 15°. When the addition was completed (2 hours), the mixture was stirred for an additional 4 hours at between 0° and 5° C. and then placed in a refrigerator at 4° C. overnight. The solid, which separated from the dark reaction mixture, was then filtered and air-dried. This yielded 25 grams (48%) of crude 2-cyano-6-methylpyridine. Recrystallization from hot water gave 18 grams (35%) of a purer material, melting 64° to 68° C. An analytical sample was prepared by repeated sublimations at 50° and 30 mm. pressure, giving white needles, melting 71° to 73° C. Analysis—calculated for $C_7H_6N_2$: percent C, 71.16; percent H, 5.12; and percent N, 23.72. Found: percent C, 71.11; percent H, 5.27; percent N, 23.79.

Picrate

A warm 50% ethanolic solution of the nitrile was treated with an excess of picric acid. Upon cooling, the picrate separated as yellow plates, melting 105° to 108° C. Analysis—calculated for $C_{13}H_9N_5O_7$: percent C, 44.96; and percent H, 2.61. Found: percent C, 45.06; and percent H, 2.80.

6-methyl picolinic acid

A mixture of 2 grams of 2-cyano-6-methylpyridine and 100.0 ml. of 0.500 N sodium hydroxide solution was refluxed for 6 hours. The solution was then evaporated to one-half of its original volume and 100.0 ml. of 0.500 N hydrochloric acid was added. The solution was then evaporated to dryness under reduced pressure and the remaining white solid was transferred to a sublimation apparatus. Sublimation at 120° and 0.5 mm. pressure gave a white microcrystalline sample of 6-methylpicolinic acid, melting 129° to 131° C., neutralization equivalent 137.7 (calculated 137.1). Analysis—calculated for $C_7H_7NO_2$: percent C, 61.30; percent H, 5.15; percent N, 10.22. Found: percent C, 60.79; percent H, 5.36; and percent N, 10.34.

EXAMPLE V

2-cyano-4-methylpyridine

To a solution of 66 grams (1.0 mole) of potassium cyanide dissolved in 250 ml. of water was slowly added an aqueous solution of 118 grams (0.5 mole) of 1-methoxy-4-methylpyridinium methyl-sulfate. The solution containing potassium cyanide was cooled in an ice bath and the addition was made at such a rate that the temperature of the reaction mixture did not rise above 15° C. When the addition was completed (2 hours), the solution was maintained at ice bath temperature with stirring for 6 hours and then transferred to a refrigerator, where the temperature was maintained at 4° C. overnight. The solid material was then filtered from the solution, yielding 28 grams (54%) of crude 2-cyano-4-methylpyridine. Recrystallization from a water ethanol mixture gave 21 grams (40%) of a purer product, melting 83° to 86° C. An analytical sample was prepared by sublimation at 50° at 30 mm. pressure, followed by recrystallization from water. This procedure gave white needles, melting 89° to 91° C. (lit. 88° to 89° C.), UV max. 261 mu; $\epsilon$ 2.30×10³; 266 mu, $\epsilon$ 2.72×10³; 273 mu, $\epsilon$ 2.22×10³. Analysis—calculated for $C_7H_6N_2$: percent C, 71.16; percent H, 5.12; and percent N, 23.72. Found: percent C, 71.03; percent H, 5.18; and percent N, 23.71.

Picrate

A warm ethanolic solution of 2-cyano-4-methylpyridine was treated with excess picric acid. Upon cooling, the picrate separated as yellow needles, melting 93° to 95° C. Anaylsis—calculated for $C_{13}H_9N_5O_7$: percent C, 44.96; and percent H, 2.61. Found: percent C, 44.77; and percent H, 2.68.

EXAMPLE VI

2-cyano-4,6-dimethylpyridine

To a solution of 66 grams (1.0 mole) of potassium cyanide dissolved in 250 ml. of water was slowly added a solution of 125 grams (0.5 mole) of 1-methoxy-2,4-dimethylpyridinium methylsulfate dissolved in 200 ml. of water. The temperature of the reaction mixture was controlled by cooling in an ice bath and the addition of the sulfate salt was made at such a rate that the temperature of the reaction mixture did not rise above 25° C. When the addition was completed (2 hours), the ice bath was removed and the mixture was stirred at room temperature for 4 hours. Then 300 ml. of chloroform was added to the mixture and, after stirring for 5 minutes, the layers were separated. The chloroform extract was dried over magnesium sulfate and evaporated in vacuo. The dark residue was then distilled under reduced pressure yielding 48 grams (73%) of 2-cyano-4,6-dimethylpyridine, boiling 115° to 122° C. at 10 mm. The distillate crystallized during the distillation, melting 44° to 46° C. An analytical sample was prepared by subliming a sample of the above material at 50° to 0.5 mm. pressure and recrystallizing the resulting solid from a dilute ethanolic solution. This method yielded fine white needles, melting 55° to 56° C. Anaylsis—caluculated for $C_8H_8N_2$: percent C, 72.70; percent H, 6.10; and percent N, 21.20. Found: percent C, 72.77; percent H, 6.02; and percent N, 21.23.

Picrate

A picrate was prepared by adding an excess of picric acid to a warm ethanolic solution of the nitrile. Upon cooling, the picrate was obtained as yellow needles, melting 100° to 102° C. Anaylsis—calculated for $C_{14}H_{11}N_5O_7$: percent C, 46.54; and percent H, 3.07. Found: percent C, 46.39; and percent H, 3.28.

EXAMPLE VII

4-cyano-2,6-dimethylpyridine

To a solution of 66 grams (1.0 mole) of potassium cyanide dissolved in 250 ml. of water was slowly added a solution of 125 grams (0.5 mole) of 1-methoxy-2,6-dimethylpyridinium methyl-sulfate dissolved in 200 ml. of water. The initial addition of 25 ml. of the sulfate solution was made at room temperature and then the reaction mixture was slowly heated on a steam bath to 55° C. The remainder of the sulfate solution was then slowly added and the temperature was maintained between 50° and 60° C. throughout the addition. When the addition was completed (2 hours), the temperature of the mixture was maintained at 80° C. by heating on a steam bath for 3 hours. The reaction mixture was then cooled and placed in a refrigerator at 4° overnight. The crystalline material which had separated from the solution was then removed and dried in a desiccator at atmospheric pressure over phosphorus pentoxide for one day. Recrystallization from a water-ethanol mixture, using Darco to clarify the hot solution, gave 54 grams (82%) of 4-cyano-2,6-dimethylpyridine, melting 78° to 81° C. An analytical sample was prepared by subliming the above material at atmospheric pressure. This gave white needles, melting 83° to 85° C. Anaylsis—calculated for $C_8H_8N_2$: percent C, 72.70; percent H, 6.10; and percent N, 21.20. Found: percent C, 72.60; percent H, 6.09; and percent N, 21.43.

Picrate

A picrate was prepared by adding an excess of picric acid to a warm ethanolic solution of the nitrile. Recrystallization from water gave yellow needles, melting 178° to 181° C. Analysis—calculated for $C_{14}H_{11}N_5O_7$: percent C, 46.54; and percent H, 3.07. Found: percent C, 46.50; and percent H, 3.30.

2,6-dimethylisonicotinic acid

Two grams of the nitrile was refluxed in a mixture of 50 ml. of ethanol and 100.0 ml. of 0.500 N sodium hydroxide solution for 4 hours. The solution was cooled and 100.0 ml. of 0.500 N hydrochloric acid solution was added and the evaporation in vacuo to dryness. The solid residue was transferred to a sublimation apparatus and sublimed at 180° and 0.05 mm. pressure. The sublimate, 2,6-dimethylisonicotinic acid, melted 276° to 280° C., with decomposition and showed a neutralization equivalent of 153 (calculated 151). Analysis—calculated for $C_8H_9NO_2$: percent C, 63.56; percent H, 6.00; and percent N, 9.27. Found: percent C, 62.35; percent H, 6.02; and percent N, 9.40.

EXAMPLE VIII

2-cyano-4-methylquinoline

To a solution of 33 grams (0.5 mole) of potassium cyanide dissolved in 250 ml. of water was slowly added a solution of 66 grams (0.25 mole) of 1-methoxy-4- methylquinoline methylsulfate. The temperature of the reaction mixture was held below 25° C. by cooling in an ice bath when necessary. When the addition was completed (2 hours), the mixture was stirred at room temperature for 4 hours. The mixture was then cooled at 10° C. and the solid filtered from the solution. Recrystallization of this solid from a water-ethanol mixture gave 25 grams (65%) of white needles, melting 92° to 95° C. An analytical sample was prepared by recrystallizing a sample twice from water-ethanol mixtures. This gave white needles, melting 96° to 98° C. Anaylsis—calculated for $C_{11}H_8N_2$: percent C, 78.55; percent H, 4.79; and percent N, 16.66. Found: percent C, 78.49; percent H, 4.85; and percent N, 16.90.

*4-methylquinaldic acid*

A solution of 50 ml. of ethanol, 100.0 ml. of 0.500 N sodium hydroxide solution, and 2 grams of the nitrile was refluxed 4 hours. The solution was then cooled and 100.0 ml. of 0.500 N hydrochloric acid was added, and the solution evaporated to dryness in vacuo. The residue was placed in a sublimation apparatus and sublimed at 130° C. and 0.05 mm. This method gave the acid, melting 153° to 155° C. and showing a neutralization equivalent of 190° C. (calculated 187° C.). Anaylsis—calculated for $C_{11}H_9NO_2$: percent C, 70.58; percent H, 4.85; and percent N, 7.48. Found: percent C, 70.47; percent H, 4.95; and percent N, 7.55.

EXAMPLE IX

*1-cyanoisoquinoline*

To a solution of 49 grams (1.0 mole) of sodium cyanide dissolved in 200 ml. of water was slowly added a solution of 136 grams (0.5 mole) of 2-methoxyisoquinolinium methyl-sulfate. The temperature of the reaction mixture was maintained between 10° and 20° C. throughout the addition (2 hours). The solution was stirred for an additional 3 hours and the solid which had separated removed by filtration. After drying, there remained 73 grams (95%) of crude 1-cyanoisoquinoline. Recrystallization from a water-ethanol mixture gave 63 grams (82%) of the nitrile, melting 86° to 90° C. An analytical sample was prepared by further recrystallization from water-ethanol mixtures, giving fine white needles, melting 92° to 93° C. Anaylsis—calculated for $C_{10}H_6N_2$: percent C, 77.91; percent H, 3.92; and percent N, 18.18. Found: percent C, 78.02; percent H, 3.87; and percent N, 18.47.

EXAMPLE X

*2-cyano-3-methylpyridine*

A solution of 118 grams (0.5 mole) of 1-methoxy-3-methylpyridinium methyl-sulfate dissolved in 200 ml. of water was slowly added to a solution of 66 grams (1.0 mole) of potassium cyanide dissolved in 200 ml. of water. The temperature of the reaction mixture was maintained between 10° and 15° C. throughout the addition. When the addition was complete (1.5 hours), the mixture was cooled in an ice bath and stirred for 5 hours, and then maintained at 4° C. overnight in a refrigerator. The solid, which had separated from the solution on standing, was filtered from the mixture giving 36% crude yield of 2-cyano-3-methylpyridine. Recrystallization from water gave 13 grams (23%) of the nitrile, melting 85° to 88° C. An analytical sample, prepared by further sublimation and recrystallization, melted 87° to 90° C. Analysis—calculated for $C_7H_6N_2$: percent C, 71.16; percent H, 5.12; and percent N, 2372. Found: percent C, 71.15; percent H, 5.25; and percent N, 23.94.

*Picrate*

A picrate was prepared from an ethanolic solution of the nitrile containing an excess of picric acid. Recrystallization from water gave yellow needles, melting 100° to 102° C. Analysis—calculated for $C_{13}H_9N_5O_7$: percent C, 44.96; and percent H, 2.61. Found: percent C, 44.69; and percent H, 2.63.

EXAMPLE XI

*2,4-dicyanopyridine*

To 26 grams (0.25 mole) of 4-cyanopyridine-1-oxide was slowly added 31.5 grams (0.25 mole) of dimethyl sulfate. When the addition was complete, the solution was heated for 3 hours on a steam bath. The 1-methoxy-4-cyanopyridinium methyl-sulfate thus obtained as a thick reddish oil, was dissolved in 100 ml. of water. Upon solution, 8 grams (0.77 mole) of 4-cyanopyridine-1-oxide separated from the solution. The solid was removed by filtration and the filtrate, containing 0.173 mole of the methoxy salt, was slowly added to a solution of 33 grams (0.4 mole) of potassium cyanide dissolved in 100 ml. of water. The addition was made at such a rate that the temperature of the reaction mixture varied between 0° and 5° C. When the addition was complete, the solution was allowed to stand at room temperature for one hour. The solid, which had separated from the solution, was removed by filtration and recrystallized from water. There was obtained by this method 11.8 grams (54%) of 2,4-dicyanopyridine, melting 88° to 91° C. Analysis—calculated for $C_7H_3N_3$: percent C, 65.12; percent H, 2.34; and percent N, 32.55. Found: percent C, 65.07; percent H, 2.53; and percent M, 32.21.

EXAMPLE XII

*2-cyanoquinoline*

A solution of 136 grams (0.5 mole) of 1-methoxyquinolinium methyl-sulfate dissolved in 200 ml. of water was slowly added to a solution of 49 grams (1.0 mole) of sodium cyanide dissolved in 200 ml. of water. The temperature of the reaction mixture was maintained at 10° to 15° throughout the addition. When the addition was complete (1 hour), the solution was stirred for 2 hours at room temperature. The tan solid which separated from the solution was removed by filtration. This gave the theoretical yield of 2-cyanoquinoline. Recrystallization from water gave 71.6 grams (93%) of the nitrile, melting 90° to 92° C. An analytical sample, which melted 94° to 96° C., was prepared by further recrystallization. Analysis—calculated for $C_{10}H_6N_2$: percent C, 77.91; percent H, 3.92; and percent N, 18.18. Found: percent C, 78.22; percent H, 4.01; and percent N, 17.95.

EXAMPLE XIII

*4-cyano-2-methylquinoline*

A solution of 143 grams (0.5 mole) of 1-methoxy-2-methyl-quinolinium methyl-sulfate dissolved in 200 ml. of water was slowly added to a solution of 49 grams (1.0 mole) of sodium cyanide dissolved in 200 ml. of water. The temperature of the reaction mixture was maintained between 25° and 30° C. throughout the addition. When the addition was complete (1.5 hours), the solution was stirred overnight at room temperature. The dark solid which had separated from the solution was removed by filtration. This solid was suspended in 200 ml. of water and steam-distilled. A white solid crystallized from the distillate. Recrystallization of the solid gave 6 grams (7.2%) of 4-cyano-2-methylquinoline as white silky needles, melting 105° to 106° C. Analysis—calculated for $C_{11}H_8N_2$: percent C, 78.55; percent H, 4.79; and percent N, 16.66. Found: percent C, 78.25; percent H, 5.04; and percent N, 16.87.

EXAMPLE XIV

*Preparation of 4-cyano-5-carbethoxy-2-methylpyridine-1 oxide 6-methylnicotinic acid*

6-METHYLNICOTINIC ACID 6-methylnicotinic acid was prepared from 5-ethyl-2-methylpyridine by the method of Murahashi and Otuka [1] with modifications. To a solution of 4.2 grams of am- ---
[1] S. Murahashi and S. Otuka, Mem. Inst. Sci. Ind. Research, Osaka Univ. 7, 127 (1950); CA 45, 9054 (1951).

monium vanidate dissolved in 4½ l. of concentrated nitric acid (sp. gr. 1.42), was slowly aded 1000 grams of 5-ethyl-2-methypyridine. The resulting solution was refluxed 24 hours and then an aditional 2¼ l. of concentrated nitric acid was added. After the solution had refluxed a total of 96 hours, a final addition of 2¼ l. of concentrated nitric acid was made and the solution refluxed an additional 48 hours. The solution was then evaporated to dryness in vacuo and the white crystalline acid salts remaining were dissolved in 8 l. of water. To the resulting solution was aded 5000 grams of Amberlite IR-45 (weak base anion exchanger) ion exchanger resin and the mixture was stirred until the pH of the solution was 3.8 (3 hours). The resin was removed by filtration and the filtrate was evaporated in vacuo. When nearly all of the water had been removed, 2 l. of acetone was aded and the resulting mixture was filtered. The filter cake was washed with acetone and dried. This method gave 465 grams (46%) of 6-methylnicotinic acid melting 209°–210° C. The literature reports [1] the melting point as 209–210° C. When the acid was recrystallized from acetone, it showed a melting point of 210°–210.5° C.

PICRATE

A hot ethanolic solution of 6-methylnicotinic acid was treated with picric acid. The picrate separated from the solution as yellow plates, melting 198°–200° C.

ETHYL 6-METHYLNICOTINATE

A solution of 412 grams (3.0 mole) of 6-methylnicotinic acid dissolved in 3 l. of anhydrous ethyl alcohol was saturated with hydrogen chloride gas. When the addition of the gas was complete, the solution was heated at reflux for 7 hours, whereupon it was cooled to room temperature and allowed to stand overnight. The ethanol and excess hydrogen chloride were removed on a steam bath in vacuo. The remaining crystalline hydrochloride was dissolved in 2 l. of cold water and treated with 2 kg. of Amberlite IR-45 (a weak base anion exchange resin). The mixture was stirred for three hours, and the resin was removed by filtration and washed with 1 l. of chloroform. The filtrate was extracted with three-500 ml. portions of chloroform. The extract was dried over magnesium sulfate and evaporated in vacuo. The residual ethyl 6-methylnicotinate was distilled in vacuo and the fraction boiling 60°–61° C. at 0.05 mm. was collected. This gave 360 grams (73%) of the desired ester with a refractive index of $n_D^{25}$ 1.5022.

PICRATE

A hot ethanolic solution of the ester was treated with picric acid. Upon cooling, the picrate separated from the solution as fine yellow needles, melting 165° to 168° C.

ETHYL 6-METHYLNICOTINATE-1-OXIDE

To a solution of 330 grams (2.0 mole) of ethyl 6-methylnicotinate dissolved in 800 ml. of glacial acetic acid was added 60 grams of 35% hydrogen peroxide. The solution was slowly heated to 70° C. and maintained at this temperature for one hour, at which time an additional 60 grams of 35% hydrogen peroxide was added. After heating for an additional two hours at 70° C., a final addition of 80 grams of 35% hydrogen peroxide was made, and the temperature was maintained at 70° C. overnight. The solution was evaporated on a steam bath in vacuo and the residue was dissolved in 2 l. of water and stirred with 500 grams of Amberlite IR-45 (a weak base anion exchange resin) for one hour. The resin was removed by filtration and the solution evaporated in vacuo. The oily residue, ethyl 6-methylnicotinate-1-oxide (315 grams, 88%), was used in subsequent experiments without further purification. A small sample (10 grams) of the N-oxide was distilled in vacuo and a fraction was collected, boiling 125° C. at 0.1 mm. Upon cooling, the distillate crystallized and melted at 47°–48° C.

1-METHOXY-2-METHYL-5-CARBETHOXYPYRIDINIUM METHYL-SULFATE

To 290 grams (1.6 mole) of ethyl 6-methylnicotinate-1-oxide was slowly added 215 grams (1.7 mole) of dimethyl sulfate. The addition was made at a rate such that the temperature of the reaction mixture was maintained between 90° and 100° C. at first by the exothermic nature of the reaction and then by heating with an oil bath. The addition of dimethyl sulfate was completed in two hours and the temperature was maintained between 90° and 100° C. for an additional two hours. 1-methoxy-2-methyl-5-carbethoxypyridinium methyl-sulfate was obtained as a brown oil and was used in subsequent experiments without further purification.

4-CYANO-5-CARBETHOXY-2-METHYLPYRIDINE

To a solution of 320 grams (4.8 mole) of potassium cyanide dissolved in 1.5 liters of water was slowly added a solution of 505 grams (1.6 mole) of 1-methoxy-2-methyl-5-carbethoxypyridinium methyl-sulfate. The flask containing the potassium cyanide solution was cooled before the addition to −10° C. by means of an ice-salt bath, and during the addition the temperature of the reaction mixture was held between 0° and −5° C. When the addition was complete (three hours), the solution was slowly warmed to room temperature and stirred for an additional two hours. The reaction mixture was extracted twice with 750 ml. portions of chloroform. The extract was dried over magnesium sulfate and evaporated on a steam bath in vacuo. The residual oil was distilled in vacuo through a packed fractionating column with a heating jacket and a partial take-off head. After a small fore-run of ethyl 6-methylnicotinate (25 grams, B.P. 50° to 65° C. at 0.15 mm.), there was collected three fractions boiling 105° to 110° C., 110° to 113° C., and 113° to 118° C., all of which solidified at room temperature. The fractions were recrystallized individually from water-acetone mixtures, and all gave the same white crystalline solid, 4-cyano-5-carbethoxy-2-methylpyridine, melting 89.0 to 90.5° C. There was obtained a combined total of 115 grams (37.6%) of the nitrile-ester: UV max. 286 mμ; ($\epsilon$ 7.4×10³); in ethanol. Analysis—calculated for $C_{10}H_{10}N_2O_2$: percent C, 63.14; percent H, 5.30; and percent N, 14.73. Found: percent C, 63.06; percent H, 5.21; and percent N, 14.90. Saponification equivalent—calculated 190.2; found 189.8.

*Hydrolysis.*—A sample of the nitrile was hydrolyzed with hot alcoholic potassium hydroxide solution and the solution neutralized with dilute hydrochloric acid. The sample gave no positive color reaction with ferrous sulfate solution. This test is positive when a pyridine-2-carboxylic acid is present and the result indicates that only the nitrile resulting from the addition of cyanide ion to the 4-position of the methoxy methyl-sulfate salt is present.

4-CYANO-5-CARBETHOXY-2-METHYLPYRIDINE-1-OXIDE

To a solution of 1.0 gram (0.01 mole) of 4-cyano-5-carbethoxy-2-methylpyridine dissolved in 15 ml. of glacial acetic acid was added 5 ml. of 35% hydrogen peroxide. The solution was heated for three hours at 80° C. and then was evaporated on a steam bath in vacuo. The residual N-oxide was recrystallized from water and gave 1.4 grams of 4-cyano-5-carbethoxy-2-methylpyridine-1-oxide as pale yellow needles, melting 165° to 167° C. UV max. 300 mμ ($\epsilon$ 2.0×10⁴); 242 mμ, ($\epsilon$ 2.9×10⁴).

*Alternate preparation of ethyl 6-methylnicotinate-1-oxide*

6-METHYLNICOTINIC ACID

To a solution of 1 gram of 6-methylnicotinic acid dissolved in 1.26 ml. of glacial acetic acid was added 2.5 ml. of 35% hydrogen peroxide. The solution was slowly heated to 80° on a steam bath, and maintained at this temperature for three hours. Upon cooling, 6-methylnicotinic acid-1-oxide separated from the solution (0.65 gram, 58%) as white needles, melting 251°–252° C.

*Neutralization equivalent.*—Calculated for $C_7H_7NO_3$: 153. Found: 157.

ETHYL 6-METHYLNICOTINATE-1-OXIDE FROM 6-METHYLNICOTINIC ACID-1-OXIDE

A solution of 5 grams of 6-methylnicotinic acid-1-oxide dissolved in 50 ml. of anhydrous ethyl alcohol was saturated with hydrogen chloride gas and then heated at reflux for 2.5 hours. The solution was evaporated on a steam bath in vacuo and the hydrochloride of the ester-N-oxide was taken up in 10 ml. of water. This solution was neutralized with saturated sodium carbonate solution and the resulting mixture was extracted with three 25 ml. portions of chloroform. The combined extract was dried over magnesium sulfate and evaporated in vacuo. The residue was placed in a sublimation apparatus and sublimed at 35° at 0.05 mm. The sublimate, ethyl 6-methylnicotinate-1-oxide, melted 47° to 48° C. and was identical with the material obtained by the oxidation of ethyl 6-methylnicotinate with hydrogen peroxide as shown by a mixture melting point determination and a comparison of infrared spectra.

I claim:

1. A process for the introduction of cyano groups into the nucleus of a nitrogen-containing heterocycle selected from the group consisting of pyridines, quinolines and isoquinolines, said pyridines having one or more of the 2, 4 and 6 positions available for substitution, said quinolines having available for substitution one or more of the 2 and 4 positions, said isoquinolines having the 1 position available for substitution, said nitrogen having heterocycles containing as substituents groups selected from the group consisting of 0 to 1 electrophilic groups selected from the group consisting of CN and COOR in which R is an alkyl group containing 1 to 4 carbon atoms, 0 to 3 substituents selected from the group consisting of alkoxy having 1 to 4 carbon atoms, alkyl having 1 to 8 carbon atoms, and aryl, which comprises reacting the N-alkoxy-quaternary inorganic salts in which the alkoxy group has 1 to 10 carbon atoms of said nitrogen-containing heterocycles with a compound which provides cyanide ion at a temperature of from −10° C. to 100° C. and recovering the cyano derivative so formed.

2. A process as set forth in claim 1 in which the reaction between the N-alkoxy quaternary inorganic salt in which the alkoxy group has 1 to 10 carbon atoms and the compound which provides cyanide ion is carried out in the presence of a solvent selected from the group consisting of water, methanol, ethanol, and mixtures thereof.

3. A process as set forth in claim 1 in which the reaction between the N-alkoxy quaternary inorganic salt in which the alkoxy group has 1 to 10 carbon atoms and the compound which provides cyanide ion is carried out in the presence of water.

4. A process as set forth in claim 1 in which the N-alkoxy quaternary inorganic salt in which the alkoxy group has 1 to 10 carbon atoms of said nitrogen-containing heterocyle as set forth in claim 1 is prepared by reacting the nitrogen-containing heterocycle with hydrogen peroxide to form the N-oxide and subsequently reacting the N-oxide at a temperature of from 50° C. to 100° C. with an alkyl inorganic salt, said alkyl group having 1 to 10 carbon atoms, and recovering the N-alkoxy quaternary compound so formed.

5. A process as set forth in claim 4 in which the alkyl salt is a dialkyl sulfate, said alkyl group containing 1 to 10 carbon atoms.

6. A process as set forth in claim 5 in which the dialkyl sulfate is dimethyl sulfate.

7. A process as set forth in claim 1 in which the compound which provides cyanide ion is selected from the group consisting of the alkali metal and alkaline earth metal cyanides and ammonium cyanide.

8. A process as set forth in claim 1 in which the compound which provides cyanide ion is sodium cyanide.

9. A process as set forth in claim 1 in which the compound which provides cyanide ion is potassium cyanide.

10. A process as set forth in claim 1 in which the compound which provides cyanide ion is ammonium cyanide.

References Cited in the file of this patent

Darnow: Deut. Chem. Ges., Berichte, vol. 72 B, p. 1550 (1939).
Graf et al.: Chem. Abst., vol. 30, p. 7576 (1936).
Hamer: J. Chem. Soc. pp. 1008–13 (1939).
Linstead et al., J. Chem. Soc., p. 919 (1936).
Mumm et al.: Justis Liebig's Annalen der. Org. Chem., vol. 514, pp. 35 to 40 (1934).
Reider et al.: Chem. Abst., vol. 36, p. 5174 (1942).

UNITED STATES PATENT OFFICE
CERTIFICATE OF CORRECTION

Patent No. 2,991,285                                                July 4, 1961

Wayne E. Feely

It is hereby certified that error appears in the above numbered patent requiring correction and that the said Letters Patent should read as corrected below.

Column 19, lines 37 and 38, for "nitrogen having heterocycles containing" read -- nitrogen-containing heterocycles having --.

Signed and sealed this 29th day of May 1962.

(SEAL)
Attest:

ERNEST W. SWIDER
Attesting Officer

DAVID L. LADD
Commissioner of Patents